(12) United States Patent
Knoeller et al.

(10) Patent No.: US 10,761,006 B2
(45) Date of Patent: Sep. 1, 2020

(54) AIR-CONDITIONING SYSTEM FOR A VEHICLE

(71) Applicant: Mahle International GmbH, Stuttgart (DE)

(72) Inventors: Rainer Knoeller, Jettingen (DE); Markus Michael, Ilsfeld (DE); Anja Reiter, Schorndorf (DE); Walter Wolf, Oppenweiler-Zell (DE)

(73) Assignee: Mahle International GmbH (DE)

( * ) Notice: Subject to any disclaimer, the term of this patent is extended or adjusted under 35 U.S.C. 154(b) by 65 days.

(21) Appl. No.: 16/120,299

(22) Filed: Sep. 2, 2018

(65) Prior Publication Data

US 2019/0072473 A1    Mar. 7, 2019

(30) Foreign Application Priority Data

Sep. 4, 2017    (DE) .................... 10 2017 215 450

(51) Int. Cl.
*G01N 15/06*    (2006.01)
*B60H 1/00*    (2006.01)
(Continued)

(52) U.S. Cl.
CPC ............. *G01N 15/06* (2013.01); *B60H 1/008* (2013.01); *B60H 1/00792* (2013.01);
(Continued)

(58) Field of Classification Search
CPC ........... G01N 15/06; G01N 2015/0046; G01N 2015/0693; B60H 1/00792; B60H 1/008;
(Continued)

(56) References Cited

U.S. PATENT DOCUMENTS 5,377,528 A  *  1/1995  Dauvergne ......... B60H 1/00792
                                                165/11.1
8,115,931 B2     2/2012  Miklos et al.
(Continued)

FOREIGN PATENT DOCUMENTS

CN            104200605 A  * 12/2014   ............. G01N 15/06
DE    10 2007 014 519 A1    10/2008
(Continued)

OTHER PUBLICATIONS

English abstract for DE-10 2007 018 517.

*Primary Examiner* — Mohamed K Amara
(74) *Attorney, Agent, or Firm* — Fishman Stewart PLLC (57) ABSTRACT

An air-conditioning system of a vehicle for air-conditioning a vehicle interior compartment may include a channel system which is flowed through by air and a sensor device for detecting at least one property of air. The sensor device may include at least one analysis channel through which air is flowable during operation, and a generating device configured to generate and emit electromagnetic waves. The sensor device may also include a diverting device configured to divert the electromagnetic waves emitted by the generating device at least partially into an interaction section of the at least one analysis channel, through which interaction section the diverted electromagnetic waves may pass and interact with air flowing through the at least one analysis channel. The sensor device may also include a detector which detects the diverted electromagnetic waves after the interaction with the air.

20 Claims, 6 Drawing Sheets

(51) Int. Cl.
*G01N 15/00* (2006.01)
*F24F 110/64* (2018.01)
*F24F 110/65* (2018.01)

(52) U.S. Cl.
CPC ...... B60H 1/00849 (2013.01); *F24F 2110/64* (2018.01); *F24F 2110/65* (2018.01); *G01N 2015/0046* (2013.01); *G01N 2015/0693* (2013.01)

(58) Field of Classification Search
CPC ............... B60H 1/00849; B60H 3/0608; F24F 2110/64; F24F 2110/65
See application file for complete search history.

(56) References Cited

U.S. PATENT DOCUMENTS

| | | | | |
|---|---|---|---|---|
| 2004/0003602 | A1* | 1/2004 | Straub | B60H 1/3233 62/91 |
| 2005/0044863 | A1* | 3/2005 | Maeda | B60H 1/00764 62/125 |
| 2005/0098640 | A1* | 5/2005 | Ichishi | B60H 1/00742 236/49.3 |
| 2010/0144261 | A1* | 6/2010 | Barkic | B60H 1/00785 454/75 |
| 2012/0241126 | A1* | 9/2012 | Kishi | B60H 1/008 165/42 |
| 2012/0319853 | A1* | 12/2012 | Goulet | G08B 17/10 340/632 |
| 2013/0278939 | A1 | 10/2013 | Pfister et al. | |
| 2015/0153275 | A1* | 6/2015 | Park | G01N 33/0036 356/336 |
| 2015/0247788 | A1* | 9/2015 | Paul | G01N 21/3504 356/338 |
| 2016/0334320 | A1* | 11/2016 | Cho | G01N 15/06 |
| 2016/0356519 | A1* | 12/2016 | Choi | F24F 3/1603 |
| 2017/0268994 | A1* | 9/2017 | Kawai | G01N 15/06 |
| 2017/0276592 | A1* | 9/2017 | Kwon | G01N 15/1425 |
| 2019/0039739 | A1* | 2/2019 | Winter | B64D 13/06 |
| 2019/0070922 | A1* | 3/2019 | Eberle | B60H 1/008 |
| 2019/0070923 | A1* | 3/2019 | Knoeller | B60H 1/00271 |
| 2019/0070926 | A1* | 3/2019 | Eberle | B60H 1/008 |
| 2019/0346359 | A1* | 11/2019 | Kinugasa | G01N 15/1404 |

FOREIGN PATENT DOCUMENTS

| | | |
|---|---|---|
| DE | 10 2007 018 517 A1 | 10/2008 |
| DE | 10 2010 053 726 A1 | 5/2012 |
| WO | WO-2004033235 A1 * 4/2004 | ............ B60H 1/247 |
| WO | WO-2016/083697 A1 | 6/2016 |

\* cited by examiner

AIR-CONDITIONING SYSTEM FOR A VEHICLE

CROSS-REFERENCE TO RELATED APPLICATIONS

This application claims priority to German Patent Application No. DE 10 2017 215 450.0, filed on Sep. 4, 2017, the contents of which are hereby incorporated by reference in its entirety.

TECHNICAL FIELD

The present invention relates to an air-conditioning system of a vehicle for the air-conditioning of a vehicle interior compartment. The invention furthermore relates to a vehicle having an air-conditioning system of said type.

BACKGROUND

A generic air-conditioning system conducts air to a vehicle interior compartment for the purposes of air-conditioning. For this purpose, the air-conditioning system commonly has a channel system which is flowed through by air during the operation of the air-conditioning system. During the operation of the air-conditioning system, it is desirable to identify properties of the air in the channel system and/or in the vehicle interior compartment and/or outside the air-conditioning system or the associated vehicle, in order to operate the air-conditioning system correspondingly. For example, if the quality of the air in the vehicle interior compartment is better than the quality of the air outside the air-conditioning system or the vehicle, that is to say in the surroundings from which the air-conditioning system draws air, it may be expedient for the air-conditioning system to be operated in an air recirculation mode in which air from the vehicle interior compartment is recirculated.

To determine a property of the air, it is conceivable to use a sensor device. Here, for the detection of the property of the air, use may be made of electromagnetic waves. DE 10 2007 014 519 A1 discloses a sensor device of said type, wherein, within and on an air-conducting channel, there are provided multiple mirrors for the purposes of reflecting light multiple times in order to generate a photoacoustic signal.

The use of a sensor device operated with electromagnetic waves for the purposes of detecting at least one property of air in an air-conditioning system of a vehicle has proven to be difficult in particular owing to the limited available structural spaces and the prerequisites with regard to the admissible weight.

SUMMARY

The present invention is therefore concerned with the object of specifying, for an air-conditioning system of a vehicle and for a vehicle of said type, improved or at least different embodiments which permit simplified and/or structural-space-saving use of a sensor device which uses electromagnetic waves to detect at least one property of air.

Said object is achieved according to the invention by means of the subject matter of the independent claim(s). The subject matter of the dependent claim(s) relates to advantageous embodiments.

The present invention is based on the general concept of equipping an air-conditioning system of a vehicle with a sensor device in which, for the detection of at least one property of air, use is made of electromagnetic waves which are generated and emitted in the sensor device, wherein a diversion of the generated and emitted electromagnetic waves takes place in the sensor device. The diversion of the electromagnetic waves makes it possible for a generating device used for generating and emitting the electromagnetic waves to be arranged in a space-saving manner, and/or in principle at any desired location or with any desired orientation, within the sensor device. In particular, the generating device may in principle be arranged in any desired manner relative to an interaction section in which the electromagnetic waves interact with the air whose property is to be detected. Consequently, the sensor device can be produced in compact form and can be easily adapted to the structural space conditions, such that also the air-conditioning system can be realized in a more compact and/or more flexible manner in terms of structural space. Furthermore, the electromagnetic waves can be diverted to different such interaction sections such that, using the same generating device, at least one property of air in different interaction sections can be detected. This leads to a further simplified embodiment of the sensor device and to a further reduction of the required structural space. Furthermore, the weight of the sensor device and thus of the air-conditioning system can be reduced.

According to the concept of the invention, the air-conditioning system has the sensor device and a channel system which is flowed through by air during operation. The sensor device has at least one analysis channel which can be flowed through by air during the operation of the air-conditioning system, wherein the analysis channel is flowed through by air whose at least one property is determined by means of the sensor device. The sensor device furthermore has the generating device which generates and emits electromagnetic waves during operation. According to the invention, the sensor device furthermore has a diverting device which at least partially diverts the electromagnetic waves emitted by the generating device, such that the diverted electromagnetic waves pass, or pass through, said interaction section, wherein the interaction section is an interaction section of the analysis channel. That is to say, the diverting device can divert the electromagnetic waves emitted by the generating device in the direction of the interaction section. The electromagnetic waves, as they pass through the interaction section, interact with the air flowing through the analysis channel, wherein the interaction of the electromagnetic waves with the air makes it possible to draw conclusions regarding the at least one property of the air. For this purpose, the sensor device has a detector which detects the diverted electromagnetic waves after the interaction with the air.

The sensor device, in particular the diverting device, makes it possible for the generating device to be arranged in any desired manner relative to the at least one analysis channel. The generating device may for example be arranged such that the emitted electromagnetic waves, before the diversion by means of the diverting device, run along the analysis channel, in particular axially parallel with respect to the analysis channel.

The at least one property of the air is preferably one which correlates with or corresponds to the quality of the air. In particular, the at least one property of the air is a concentration and/or density of particles, for example fine dust particles, in the air. Accordingly, by means of the sensor device, it is possible to detect the quality of the air, in particular the particle concentration, for example the fine dust particle load. The at least one property may also be the concentration of nitrogen oxides and/or carbon oxides and/or oxygen and the like in the air.

The sensor may in principle have only one such analysis channel. The analysis channel in this case normally has one such interaction section. It is however also conceivable for the analysis channel to be equipped with two or more such interaction sections, wherein the diverting device can divert the electromagnetic waves emitted by the generating device such that the diverted electromagnetic waves pass through at least two of the interaction sections, that is to say the diverting device diverts the emitted electromagnetic waves in particular in the direction of the respective interaction section.

Preferred embodiments provide two such analysis channels, wherein the respective analysis channel has one such interaction section. Here, the diverting device is designed so as to divert the electromagnetic waves emitted by the generating device such that the diverted waves at least partially pass through the respective interaction section. It is conceivable for the diverting device to be designed so as to split the electromagnetic waves emitted by the generating device into at least two partial beams, such that the respective interaction section is subjected to at least one of the partial beams, which passes through it. It is particularly preferable here if the generating device is arranged between the analysis channels, because the sensor device can thus be produced in compact form.

The analysis channels may in principle run in any desired manner relative to one another. The analysis channels may in particular run parallel to one another and be arranged so as to be spaced apart from one another. It is particularly preferable here if the generating device is arranged between the analysis channels. It is conceivable here for the generating device to emit the electromagnetic waves along the extent of at least one of the analysis channels, in particular axially parallel thereto, wherein the diverting device diverts the emitted electromagnetic waves in the direction of the interaction sections, in particular splits said electromagnetic waves into said partial beams. It is conceivable for the diverted electromagnetic waves, in particular a partial beam of said type, to pass through two or more such interaction sections and, in so doing, interact with air in at least one of the interaction sections.

If the sensor device has two such analysis channels, it is preferable if the diverting device is arranged at least partially between the analysis channels. In this way, the sensor device can be designed in simplified and structural-space-saving form.

The generating device is advantageously arranged so as to emit the electromagnetic waves along an extent direction of at least one such analysis channel. If the sensor device has two or more such analysis channels, it is advantageous if the extent directions of the analysis channels which are spaced apart from one another run substantially parallel. In this case, the generating device is preferably arranged so as to emit the electromagnetic waves along, in particular parallel to, the extent directions of the analysis channels. Consequently, the sensor device can be of simplified and structural-space-saving design.

It is furthermore advantageous if the extent directions of the analysis channels and the direction in which the electromagnetic waves are emitted lie in a plane, in particular a flat plane. In this way, the sensor device can be of more compact design, in particular transversely with respect to the extent directions. It is also conceivable for the generating device to be arranged so as to emit the electromagnetic waves outside said plane.

The generating device may in principle generate electromagnetic waves of any desired type, that is to say in particular of any desired wavelength and/or period. In particular, the generating device may generate and emit pulsed electromagnetic waves. Furthermore, the generating device may in particular generate and emit monochromatic electromagnetic waves.

Preferred embodiments provide a generating device which generates electromagnetic waves in the optical range. The generating device is thus preferably designed as an optical generating device. The generating device in this case preferably has a laser, or is designed as a laser of said type. In this way, the generating device can be implemented, and/or integrated into the air-conditioning system, in simplified fashion. The wavelength of the electromagnetic waves or of the light is for example in the region of the order of magnitude of the, in particular smallest, particles to be detected in the air, and amounts in particular to between 10 and 10,000 nanometres.

The sensor device advantageously has a sensor housing which forms a common housing for the constituent parts of the sensor device. That is to say, the sensor housing accommodates the at least one analysis channel, the generating device and the diverting device and the respective detector. This also means that the generation of the electromagnetic waves and the emission thereof, the diversion of the electromagnetic waves and the interaction of the diverted electromagnetic waves with the air in the respective interaction section take place within the sensor device or the sensor housing. Consequently, the sensor device is of simple and structural-space-saving design.

The diverting device is in principle designed in any desired manner as long as it permits a diversion of the electromagnetic waves emitted by the generating device such that the diverted electromagnetic waves pass through at least one such interaction section.

Diverting devices are conceivable which have at least one beam splitter for splitting the electromagnetic wave emitted by the generating device into at least two partial beams. Such a beam splitter may in particular be in the form of a mirror with a predefined transparency for the electromagnetic waves. The use of such a mirror permits an inexpensive and simple embodiment of the sensor device.

Embodiments are preferable in which the diverting device has at least one conductor which carries the electromagnetic waves, wherein the conductor runs so as to carry the electromagnetic waves emitted by the generating device to at least one such interaction section, such that the electromagnetic waves thus carried pass through the interaction section. The use of a conductor of said type makes it possible for the electromagnetic waves emitted by the generating device to be diverted not only linearly but also with any desired profile, in particular curved and the like. The profile of the diversion of the electromagnetic waves is determined here by the profile of the conductor, which may in principle be configured in any desired manner. The conductor may in particular be a light conductor, in particular glass fibre, as long as the emitted electromagnetic waves can, with regard to their wavelengths, be conducted or carried by means of a conductor of said type. The use of a conductor of said type furthermore offers the advantage that it can be mechanically fixed relative to the generating device and/or relative to the associated interaction section. In this way, the entry of the electromagnetic waves emitted by the generating device into the conductor and/or the exit of the diverted electromagnetic waves out of the conductor can be realized with increased spatial precision, in particular with improved stability in relation to mechanical influences, such as vibrations. For this purpose, the conductor may be fixed to the generating device and/or to the associated analysis channel.

It is also conceivable to use two or more such conductors, wherein the respective conductor is assigned to one such interaction section. This means in particular that the respective conductor conducts the electromagnetic waves emitted by the generating device, and entering the conductor, to the associated interaction section in such a way that the electromagnetic waves diverted by means of the conductor pass through the associated interaction section.

Alternatively or in addition, the diverting device may have at least one mirror which reflects or diverts the electromagnetic waves emitted by the generating device. It is also conceivable for multiple such mirrors to be provided in a series arrangement, such that at least one of the members diverts the electromagnetic waves in the direction of one of the other mirrors.

To improve the accuracy of the detected property of the air, the interaction section is preferably designed such that, in it, the interaction of the electromagnetic waves with the analysis channel is prevented or at least reduced. It is conceivable for this purpose for the analysis channel to be produced, in the interaction section, from a correspondingly transparent material, for example glass, plastic and the like.

The interaction section is preferably formed as an interruption of the analysis channel. This means that the diverted electromagnetic waves, as they pass through the interaction section, do not interact with the analysis channel, in particular with a channel casing which delimits a flow path through the analysis channel, and in which the interruption is formed. This leads to a more precise detection of the at least one property of the air flowing through the analysis channel.

The interruption may in this case be configured in closed encircling form, such that the analysis channel is completely interrupted in the interaction section. It is also conceivable for the interruption to be formed as an aperture of the analysis channel, through which the diverted electromagnetic waves pass at the entry and exit sides.

The air-conditioning system, in particular the sensor device, is preferably configured such that the interruption of the analysis channel to form the interaction section results in no outflow, or at least a reduced outflow, of the air flowing through the analysis channel out of the analysis channel or out of the interaction section. Here, in particular, the prevention or reduction of the outflow of the air flowing through the analysis channel out of the analysis channel or out of the interaction section prevents or reduces contamination of the sensor device, in particular of the respective detector and/or of the generating device, by the air flowing through the analysis channel.

For this purpose, the analysis channel advantageously has a nozzle which is directed in a flow direction through the analysis channel toward the interruption, hereinafter also referred to as channel nozzle, which nozzle conducts and/or focuses the air flowing through the analysis channel in the region of the interaction section such that the air, after flowing through the interaction section, flows onward through the analysis channel and/or as little air as possible exits the analysis channel.

Alternatively or in addition, the interaction section may be surrounded by a flow path of enveloping air, such that the outflow of the air flowing through the interaction section out of the analysis channel or out of the interaction section is at least reduced. For this purpose, the flow of the enveloping air through said flow path, hereinafter also referred to as enveloping-air flow path, may be realized with an elevated pressure and/or an elevated speed in relation to the flow of the air whose property is to be determined and which flows through the analysis channel.

The enveloping air preferably exhibits no interactions or at least reduced interactions with the diverted electromagnetic waves passing through the interaction section which influence the detection of the at least one property of the air flowing through the analysis channel. For this purpose, the enveloping air is different from the air flowing through the analysis channel, in particular is fresh air or purified air.

The enveloping-air flow path may be realized by means of an enveloping-air channel which surrounds the analysis channel, in particular in the region of the interaction section, wherein the enveloping-air channel may, in the region surrounding the interaction section, have an interruption such that the diverted electromagnetic waves pass through without interacting with the enveloping-air channel.

It is conceivable for the enveloping-air flow path or the enveloping-air channel and the analysis channel to be merged in the sensor device downstream of the interaction section. This means in particular that air flowing through the analysis channel and enveloping air are mixed downstream of the interaction section and conducted in a common channel which corresponds to the analysis channel and the enveloping-air channel. This simplifies the construction of the sensor device. Furthermore, it is thus possible for the air flowing through the analysis channel to emerge from the interaction section into the sensor housing in a more effective manner.

The detector which detects the diverted electromagnetic waves after an interaction with the air may in principle be arranged in any desired manner. In particular, it is conceivable for the detector to be arranged within the interaction section such that the diverted electromagnetic waves are detected after interacting with the air within the interaction section.

The detector is advantageously arranged adjacent to the interaction section. This in particular prevents the detector from interacting with the air flowing through the analysis channel, in particular from being contaminated by said air.

It is preferable if the detector is arranged outside the interaction section. In particular, the detector is arranged on that side of the interaction section which is averted from an entry side of the interaction section, wherein the entry side is that side of the interaction section through which the diverted electromagnetic waves initially enter the interaction section.

If two or more such interaction sections are provided, it is conceivable for these to be positioned relative to one another such that the diverted electromagnetic waves that have passed through the interaction sections can be detected by means of the same detector.

It is however preferable for the respective interaction section to be assigned in each case one such associated detector. This permits a more precise detection of the at least one property of the air flowing through the respective analysis channel. Furthermore, the properties of the air flowing through the respective analysis channel can be detected independently of one another and/or simultaneously.

In principle, air from any desired source may be supplied to the sensor device for the detection of the at least one property. For this purpose, the sensor device preferably has a sensor inlet which is in fluidic contact with, or fluidically connectable to, at least one of the analysis channels.

In particular, air from the channel system and/or air from the vehicle interior compartment and/or air from the surroundings of the air-conditioning system or of the vehicle may be supplied to the sensor device for the detection of at least one property. It is advantageous here if the respective source is assigned one such analysis channel with one such interaction section, such that the properties of the air from different sources can be detected independently of one another and in particular simultaneously.

The generating device is advantageously temperature-controlled, in particular cooled, during operation. This leads to an increase in quality of the generating device and/or to a more precise setting of the emitted electromagnetic waves, in particular with regard to wavelength, intensity and the like. Furthermore, the temperature control of the generating device leads to an at least reduced ageing process of the generating device, such that the service life of the sensor device and consequently of the air-conditioning system is lengthened.

For the temperature control of the generating device, use is advantageously made of air with which the generating device is impinged on. For this purpose, at least one temperature-control channel may be provided. Said air for the temperature control of the generating device is expediently air, in particular conditioned air, of the air-conditioning system. This permits simple and inexpensive temperature control of the generating device.

It is preferable if the sensor device has a sensor temperature-control chamber which is fluidically separate from the at least one analysis channel and in which the generating device is arranged and which is supplied with air for the temperature control of the generating device. Accordingly, the sensor temperature-control chamber is fluidically connected to the temperature-control channel. The arrangement of the generating device in the sensor temperature-control chamber has the effect that corresponding damage to and/or contamination of the generating device by air flowing through the analysis channel are prevented or at least reduced.

It is self-evident that not only the air-conditioning system but also a vehicle having an air-conditioning system of said type fall within the scope of this invention.

Further important features and advantages of the invention will emerge from the subclaims, from the drawings and from the associated figure description on the basis of the drawings.

It is self-evident that the features mentioned above and the features yet to be discussed below may be used not only in the respectively specified combination but also in other combinations or individually without departing from the scope of the present invention.

Preferred exemplary embodiments of the invention are illustrated in the drawings and will be discussed in more detail in the following description, wherein the same reference designations are used to denote identical or similar or functionally identical components.

DETAILED DESCRIPTION

Figure 1:
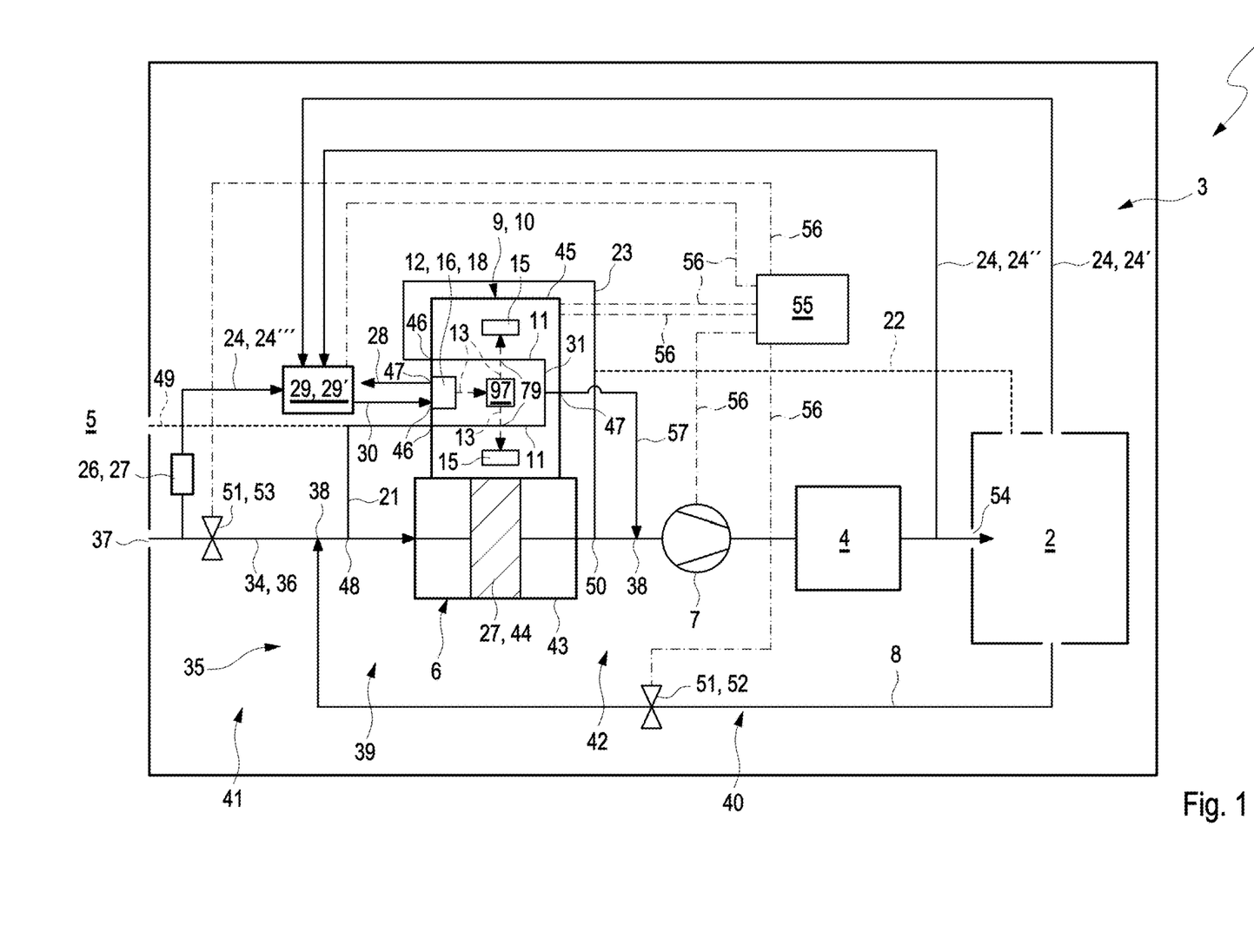
FIG. 1 shows a highly simplified illustration, in circuit diagram form, of a vehicle having an air-conditioning system.

An air-conditioning system 3, such as can be seen for example in FIG. 1, is in particular a constituent part of a vehicle 1 which has a vehicle interior compartment 2 for occupants (not shown). The air-conditioning system 3 conducts air to the vehicle interior compartment 2 for the air-conditioning of the vehicle interior compartment 2, and has a channel system 35 which is flowed through by air during operation. The air-conditioning system 3 has at least one heat exchanger 4 which is arranged in the channel system 35 and which serves for the conditioning of the air, wherein the at least one heat exchanger 4 permits the temperature control of the air and/or the alteration of the humidity in the air. The air-conditioning system 3 furthermore has, in the channel system 35, a filter device 6, hereinafter also referred to as system filter device 6, for filtering the air to be supplied to the interior compartment 2, and a conveying device 7, hereinafter also referred to as system conveying device 7, for conveying air through the air-conditioning system 3. In the examples shown, the heat exchanger 4 is arranged downstream of the conveying device 7, and the filter device 6 is arranged upstream of the filter device 7. The channel system 35 has an outside-air channel 36, by means of which outside air, that is to say air from surroundings 5 of the air-conditioning system 3 or of the vehicle 1, passes into the air-conditioning system 3. In the examples shown, the outside-air channel 36 extends from a system inlet 37, which is connected to the surroundings 5, to a system outlet 54, which is fluidically connected to the vehicle interior compartment 2, in particular is attached to the vehicle interior compartment 2, and via which air is discharged into the vehicle interior compartment 2. The filter device 6, the conveying device 7 and the at least one heat exchanger 4 are arranged in the outside-air channel 36, which will hereinafter also be referred to as main channel 34. The channel system 35 furthermore has an air recirculation channel 8 which serves for the recirculation of air from the vehicle interior compartment 2 or interior air. The air recirculation channel 8 is fluidically connected to the vehicle interior compartment 2 and to the system outlet 54, wherein the air recirculation channel 8 in the examples shown branches off from the vehicle interior compartment 2 and opens into the main channel 34 at an air recirculation opening point 38 upstream of the filter device 6 and downstream of the system inlet 37.

The air-conditioning system 3 furthermore has a sensor device 9 which detects at least one property of air. The at least one property of the air detected by means of the sensor device 9 is preferably a property which corresponds to or at least correlates with the quality. In particular, the at least one property may be a particle concentration, in particular fine dust particle concentration, the concentration of nitrogen oxides and/or carbon oxides and/or oxygen and the like. The sensor device 9 is thus in particular a fine dust particle sensor 10 for the detection of the fine dust particle content in the air, or preferably has such a fine dust particle sensor 10. The sensor device 9 has at least one analysis channel 11 which can be flowed through by air, and a generating device 12. The channel system 35 has at least one supply channel 21, 22, 23 for the supply of air to the at least one analysis channel 11. By means of the generating device 12, electromagnetic waves 13, in particular monochromatic electromagnetic waves 13, for example monochromatic light, are generated, which traverse, in particular penetrate through, the analysis channel 11 in an interaction section 79. Thus, in the interaction section 79 of the analysis channel 11, an interaction of the electromagnetic waves 13 with the air flowing through the analysis channel 11, hereinafter also referred to as air for analysis, occurs, wherein the interaction permits the detection of at least one property of the air for analysis. For this purpose, the sensor device 9 has a detector 15 which detects the electromagnetic waves 13 after the passage through the analysis channel 11 and interaction with the air. In the case of the sensor device 9 which is designed as or has a fine dust particle sensor 10, it is thus possible to detect or determine the concentration of fine dust in the air for analysis. The generating device 12 may in this case have a source 16 for generating the electromagnetic waves 13 and a controller 17 for controlling the source 16 (see FIG. 2). In the example shown, the source 16 is formed as a laser 18, which is controlled by means of the controller 17.

For the temperature control of the generating device 12, in particular of the source 16 and/or of the controller 17, a temperature-control channel 24 which differs from the main channel 34 and from the at least one supply channel 21, 22, 23 leading to the analysis channel 11 is provided, which supplies conditioned air to the sensor temperature-control chamber 19 and thus causes conditioned air to impinge on the generating device 12 for the purposes of the temperature control of the generating device 12. The conditioned air may in this case originate from the vehicle interior compartment 2 of the vehicle 1. For this purpose, a temperature-control channel 24' of said type, hereinafter also referred to as first temperature-control channel 24', conducts air from the vehicle interior compartment 2 to the sensor temperature-control chamber 19. Thus, an exchange of heat occurs between the generating device 12 and the conditioned air supplied to the sensor temperature-control chamber 19, such that temperature control of the generating device 12 is realized. Alternatively or in addition, conditioned air originating from the main channel 34 downstream of the at least one heat exchanger 4 and upstream of the vehicle interior compartment 2 may be supplied to the sensor temperature-control chamber 19, with said conditioned air thus impinging on the generating device 12. For this purpose, such a temperature-control channel 24" is provided, which will hereinafter be referred to as second temperature-control channel 24". The second temperature-control channel 24" branches off from the main channel 34 downstream of the at least one heat exchanger 4 and upstream of the vehicle interior compartment 2, in particular from a mixing chamber (not shown) of the air-conditioning system 3, and opens into the sensor temperature-control chamber 19. Alternatively or in addition, it is conceivable by means of such a temperature-control channel 24''', also referred to as third temperature-control channel 24''', for air to be branched off from the main channel 34 or outside-air channel 36 upstream of the at least one heat exchanger 4 and upstream of the system filter device 6, and thus for outside air to be supplied to the sensor temperature-control chamber 19 for the purposes of the temperature control of the generating device 12, wherein, in this case, the outside air is purified or filtered beforehand. The air that is supplied to the sensor temperature-control chamber 19 for the purposes of the temperature control of the generating device 12 flows through the sensor temperature-control chamber 19 and passes via a sensor outlet 47 and a sensor temperature-control outlet channel 28 out of the sensor temperature-control chamber 19.

It is preferable if the air which is supplied to the sensor temperature-control chamber 19 and which serves for the temperature control of the generating device 12 is purified or filtered before impinging on the generating device 12, in particular in order to prevent or reduce contamination of the source 16 or of a wave outlet region (not shown) of the source 16. For this purpose, the system filter device 6 may be used. It is also conceivable for a filter device 26 separate from the system filter device 6, hereinafter also referred to as sensor temperature-control filter device 26, to be provided in particular in the second temperature-control channel 24" and/or in the third temperature-control channel 24''', in order to filter the air before it enters the sensor temperature-control chamber 19. The respective sensor temperature-control filter device 26 may have or be designed as a fine-dust particle filter 27. In the example shown in FIG. 1, such a sensor temperature-control filter device 26 is provided only in the third temperature-control channel 24''', wherein it is also conceivable for a sensor temperature-control filter device 26 to be provided in the first temperature-control channel 24'. The temperature-control channels 24 open, in the examples shown, into a sensor temperature-control valve device 29, in particular into a multi-way valve 29', the outlet of which is fluidically connected via a sensor temperature-control supply channel 30 to the sensor temperature-control chamber 19. By means of the sensor temperature-control valve device 29, it is possible for air to be selectively supplied from the respective temperature-control channel 24' to the sensor temperature-control chamber 19, and for the generating device 12 to thus be impinged on with air for the purposes of temperature control. It is self-evidently also possible for air originating from at least two of the temperature-control channels 24 to be mixed and supplied to the sensor temperature-control chamber 19. Here, such a sensor temperature-control filter device 26 may be arranged in the sensor temperature-control channel 30 (not shown) in order to dispense with a respective separate such sensor temperature-control filter device 26 in the temperature-control channel 24.

Figure 2:
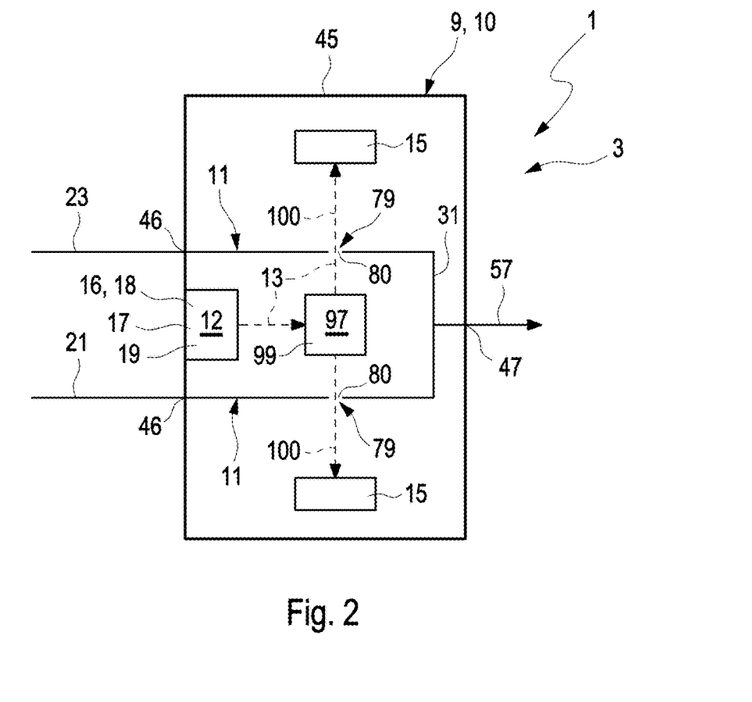
FIG. 2 shows a detailed view of the air-conditioning system from FIG. 1 in a different exemplary embodiment.

In the examples shown in FIGS. 1 and 2, the sensor device 9 has two such mutually spaced-apart analysis channels 11, wherein the generating device 12 is arranged between the substantially parallel-running analysis channels 11. The generating device 12, in particular the laser 18, is arranged so as to emit the generated electromagnetic waves 13 between and along the analysis channels 11.

The system conveying device 7 divides the channel system 35 into an upstream-side suction region 39 and a downstream-side pressure region 40. This means that the conveying device 7 separates the suction region 39 arranged upstream of the conveying device 7 from the pressure region 40 arranged downstream of the conveying device 7. The system filter device 6 furthermore splits the channel system 35 into an upstream-side untreated region 41 and a downstream-side clean region 42. The system filter device 6 has a housing 43, hereinafter also referred to as filter housing 43, in which there is arranged a filter material 44, which may be a fine dust particle filter 27 or a constituent part of such, for filtering air. Here, air is purified as it passes through the filter material 44, such that the separation of the channel system 35 into the untreated region 41 and the clean region 42 is realized by means of the filter material 44.

The sensor device 9 has a housing 45, hereinafter also referred to as sensor housing 45, in which the at least one analysis channel 11 is arranged. In the examples shown, it is furthermore the case that the generating device 12 and the detectors 15 are arranged in the sensor housing 45. The sensor device 9 furthermore has at least one sensor inlet 46 through which air is admitted into the sensor device 9, in particular into the at least one analysis channel 11. Here, the sensor devices 9 shown in FIGS. 1 and 2 have in each case two such sensor inlets 46, which are in each case fluidically connected to such an analysis channel 11. Furthermore, such a sensor inlet 46 is fluidically connected to the sensor temperature-control supply channel 30 in order to admit air into the sensor temperature-control chamber 19. The sensor device 9 furthermore has at least one sensor outlet 47 for the discharge of air out of the sensor device 9, wherein, in the examples shown, one such sensor outlet 47 is provided for discharging air flowing through the at least one analysis channel 11, and one such sensor outlet 47 is provided for discharging air from the sensor temperature-control chamber 19, which is fluidically connected to a sensor temperature-control outlet channel 28. The air flowing out of the respective sensor outlet 47 may in principle be supplied to the surroundings 5, as is illustrated for example for air flowing into the sensor temperature-control outlet channel 28. The air flowing out of the respective sensor outlet 47 may also be supplied to the channel system 35, as shown by way of example for the sensor outlet 47 that is fluidically connected to the at least one analysis channel 11. For this purpose, a sensor return channel 57 is provided which is fluidically connected to said sensor outlet 47 and which opens via a sensor opening point 58 for example into the main channel 34, wherein the sensor opening point 58 in the examples shown is arranged between the system filter device 6 and the system conveying device 7. It is also conceivable for the sensor opening point 58 to be arranged upstream of the system filter device 6 or in the untreated region 41, in order to filter the returned air by means of the system filter device 6.

The sensor housing 45 is arranged on the filter housing 43. This makes it possible for air, in particular air for analysis, to be supplied to the sensor device 9 in a simple manner and/or with reduced fluidic connections.

In the examples shown, in the untreated region 41, there is arranged an untreated branching point 48 which, for the admission of air from the untreated region 41, that is to say before the air passes through the filter material 44, in the sensor device 9, is fluidically connected to such a sensor inlet 46 in order to supply the air to one of the analysis channels 11 and detect at least one property of the air. For this purpose, a sensor untreated-air supply channel 21 is provided which extends from the untreated branching point 48 to such a sensor inlet 46. The untreated branching point 48 is preferably arranged downstream of the air recirculation opening point 38. Alternatively or in addition, as is illustrated by dashed lines, it is possible for a sensor inlet channel 49 for the admission of air from the surroundings 5 or outside air into the sensor device 9, in particular into such an analysis channel, to be provided, wherein the sensor inlet channel 49 is separate from the outside-air channel 36 or main channel 34. If such a sensor inlet channel 49 is provided, it is conceivable for a valve (not shown) to be arranged in the sensor inlet channel 49 and/or in the sensor untreated-air supply channel 21, such that, by means of said valve, air can be supplied to the sensor device 9 via the untreated branching point 48 or directly from the surroundings 5. Furthermore, in the clean region 42 of the channel system 35, there is arranged a clean branching point 50 which, for the admission of air from the clean region 42, that is to say after the air has passed through the filter material 44, into the sensor device 9, is fluidically connected to such a sensor inlet 46, in order to supply the air to one of the analysis channels 11 and detect at least one property of the air. This fluidic connection is realized by means of a sensor clean-air supply channel 23, which extends from the clean branching point 50 to the associated sensor inlet 46. The clean branching point 50 is in this case arranged upstream of the conveying device 7, wherein an arrangement downstream of the conveying device 7 and downstream of the at least one heat exchanger 4 is also possible.

The air-conditioning system 3 has a shut-off device 51 which has an air recirculation shut-off element 52, which is provided, in particular arranged, in the air recirculation channel 8, and an outside-air shut-off element 53, which is provided, in particular arranged, in the outside-air channel 36 or main channel 34. Here, the air recirculation opening point 38 is arranged downstream of the outside-air shut-off element 53. The shut-off device 51 is adjustable between an air recirculation position and an outside-air position, wherein, in the air recirculation position, the outside-air shut-off element 53 shuts off the outside-air channel 36 or main channel 34 and the air recirculation shut-off element 52 opens up the air recirculation channel 8, such that no air from the surroundings 5, and thus no outside air, passes into the air-conditioning system 3, whereas air from the vehicle interior compartment 2, and thus interior air, is drawn out of the vehicle interior compartment 2, and returned to the vehicle interior compartment 2 via the system outlet 54, and thus recirculated, by means of the conveying device 7. Here, the air originating from the vehicle interior compartment 2 passes, in the air-conditioning system 3, through the filter device 6 and through the at least one heat exchanger 4 owing to the arrangement of the air recirculation opening point 38. By contrast, in the outside-air position, the air recirculation channel 8 is shut-off by means of the air recirculation shut-off element 52, whereas the outside-air shut-off element 53 opens up the outside-air channel 36. Thus, a flow of air through the air recirculation channel 8 is prevented, whereas air from the surroundings 5, and thus outside air, passes into the air-conditioning system 3. In this way, in the air recirculation position, air from the vehicle interior compartment 2, and in the outside-air position, air from the surroundings 5 or outside air, can flow via the untreated branching point 48, such that, via the untreated branching point 48, both interior air and outside air as air for analysis can be analyzed, and in particular at least one property of the air for analysis can be detected, by means of the sensor device 9. The system conveying device 7 is arranged between the air recirculation shut-off element 52 and the outside-air shut-off element 53. It is thus possible, in the outside-air position, for air from the surroundings 5, and in the air recirculation position, for air from the vehicle interior compartment 2, to be conveyed, and supplied to the system outlet 54, by means of said system conveying device 7. It is self-evidently hereby also possible for both air from the vehicle interior compartment 2 and air from the surroundings 5 to be conveyed, and supplied to the system outlet 54, in intermediate positions.

Alternatively or in addition, the channel system 35 may have a sensor interior-air supply channel 42 (illustrated by dashed lines) which supplies air directly from the vehicle interior compartment 2 to the sensor device 9 or to such an analysis channel 11.

The air-conditioning system 3 furthermore has a control device 55, which may also be a constituent part of the vehicle 1. The control device 55 is connected in communicating fashion, via communication connections 56, to the sensor device 9, to the shut-off device 51 and thus to the shut-off elements 52, 53, to the system conveying device 7 and to the sensor temperature-control valve device 29, such that the control device 55 can respectively control and/or interrogate these. Furthermore, the control device 55 may be connected in communicating fashion to the controller 17 of the generating device 12 in order to interrogate or control this.

The control device 55 is in particular designed so as to operate the air-conditioning system 3 in an outside-air operating mode if the quality of the outside air exceeds a predefined value, in particular is better than the quality of the air from the vehicle interior compartment 2, whereas said control device operates the air-conditioning system 3 in an air recirculation operating mode if the quality of the outside air falls below a predefined value and/or the quality of the air in the vehicle interior compartment 2 is better than the quality of the outside air. For this purpose, the control device 55 adjusts the shut-off device 51, in the air recirculation operating mode, into the air recirculation position and, in the outside-air operating mode, into the outside-air position. Positions between the air recirculation position and the outside-air position are self-evidently likewise possible, such as operating modes of the air-conditioning system 3 between the air recirculation operating mode and the outside-air operating mode.

According to the invention, the sensor device 9 has a diverting device 97 which supplies electromagnetic waves 13 emitted by the generating device 12 to an interaction section 79 of at least one of the analysis channels 11, such that the diverted electromagnetic waves 13 pass through, or pass, the interaction section 79 and, in so doing, interact with air flowing through the analysis channel 11. After interacting with the air, the diverted electromagnetic waves 13 are detected by an associated detector 15, in order to detect at least one property of the air with which the electromagnetic waves 13 previously interacted. In the exemplary embodiment shown in FIG. 1, the diverting device 97 is in this case designed so as to divert the electromagnetic waves 13 emitted by the generating device 12 to the interaction section 79 of the respective analysis channel 11. This means that the diverting device 97 diverts the emitted electromagnetic waves 13 both in the direction of the interaction section 79 of one analysis channel 11 and in the direction of the interaction section 79 of the other analysis channel 11. Here, the diverting device 97 is arranged between the analysis channels 11. The respective analysis channel 11 is assigned such a detector 15, such that at least one property of air flowing through one analysis channel 11, and independently thereof at least one property of air flowing through the other analysis channel 11, can be detected by means of the same generating device 12. The detector 15 assigned to the respective analysis channel 11 or interaction section 79 is in this case advantageously arranged on that side of the interaction section 79 which is averted from the entry side of the electromagnetic waves 13 into the associated interaction section 79, and outside the interaction section 79. In this way, the detection of electromagnetic waves 13 diverted in the direction of the other interaction section 79 is prevented or at least reduced, and/or a more independent detection of the at least one property of the air flowing through the respective analysis channel 11 is made possible. The arrangement of the respective detector 15 outside the interaction section 79 has the result that contamination of the detector 15 by the air flowing through the respective analysis channel 11 is lessened or at least reduced.

The generating device 12, the diverting device 97 and the at least one analysis channel 11 are arranged in the sensor housing 45. In this way, the sensor device 9 can be produced in compact form, wherein the diverting device 97 further improves the compact design. In particular, the diverting device 97 makes it possible for the generating device 12 to be arranged in any desired manner relative to the at least one analysis channel 11, and thus for the available structural space to be utilized as efficiently as possible.

FIG. 2 shows an enlarged illustration of the air-conditioning system 3 from FIG. 1 in the region of the sensor device 9, wherein FIG. 2 shows a different exemplary embodiment of the sensor device 9. The exemplary embodiment of the sensor device 9 shown in FIG. 2 differs from the sensor device 9 shown in FIG. 1 in that the respective interaction section 79 is formed by an interruption 80 of the associated analysis channel 11. In this way, the interaction of the electromagnetic waves 13 diverted by means of the diverting device 97 with the analysis channel 11 itself, in particular with a channel casing 98 of the analysis channel 11 (see FIGS. 5-14), is prevented or at least reduced, such that the at least one property of the air detected by means of the sensor device 9 can be detected more precisely.

For the diversion of the electromagnetic waves 13 emitted by the generating device 12, the diverting device 97 may in principle be designed in any desired manner. In the examples shown in FIGS. 1 and 2, the diverting device 97 may for this purpose have at least one beam splitter 99 for splitting the electromagnetic waves 13 emitted by the generating device 12. It is conceivable for two such beam splitters 99 to be arranged one behind the other or in series, in order, by means of the respective beam splitter 99, to allow a partial beam 100 to pass through such an associated interaction section 79. This means that the diverting device 97 splits the electromagnetic waves 13 emitted by the generating device 12 into two partial beams 100, wherein the respective partial beam 100 runs or passes through one such associated interaction section 79.

Figure 3:
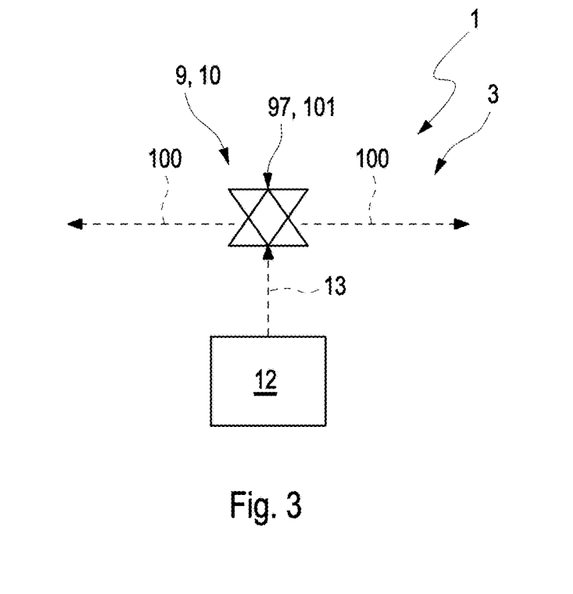
FIGS. 3 and 4 show detailed views from FIG. 2 in each case one further exemplary embodiment.
Figure 4:
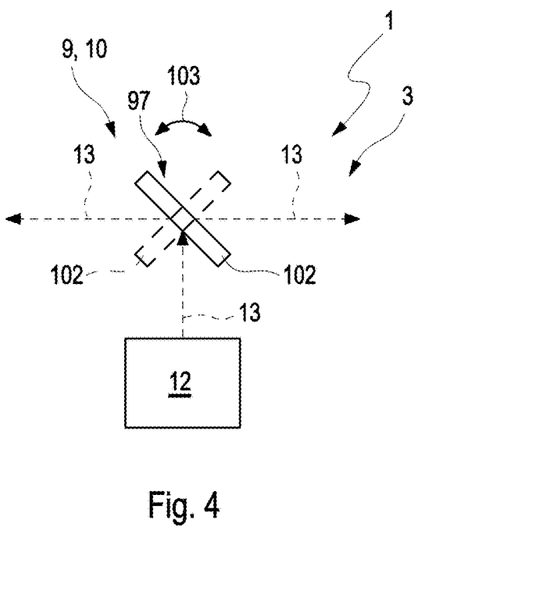

Further exemplary embodiments of the air-conditioning system or of the sensor device 9 are shown in FIGS. 3 and 4, wherein, in FIGS. 3 and 4, for the sake of a better illustration, only the generating device 12, the diverting device 97 and the corresponding electromagnetic waves 13 are shown.

In the example shown in FIG. 3, the diverting device 97 has an indicated double prism 101, or the diverting device 97 is designed as a double prism 101 of said type. By means of different angles of incidence of the electromagnetic waves 13 emitted by the generating device 12 on the respective prism of the double prism 101, the double prism 101 splits the emitted electromagnetic waves 13 into two partial beams 100, wherein the respective partial beam 100 passes through such an associated interaction section 79.

In the exemplary embodiment shown in FIG. 4, the diverting device 97 has a mirror 102 which, as indicated by a double arrow 103, is adjustable between the positions illustrated by solid lines and the positions illustrated by dashed lines, wherein the mirror 102, in one of said positions, diverts the electromagnetic waves 13 emitted by the generating device 12 in the direction of one such interaction section 79 and, in the other position, diverts said electromagnetic waves in the direction of the other such interaction section 79.

Figure 5:
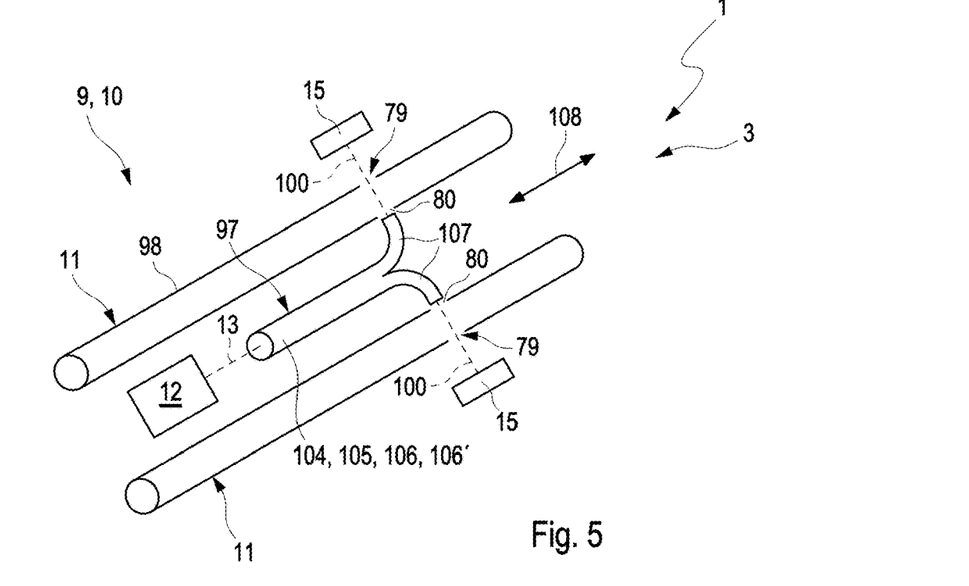
FIG. 5 shows an internal three-dimensional view of a sensor device of the air-conditioning system with a diverting device.

FIG. 5 shows a further exemplary embodiment of the air-conditioning system 3 or of the sensor device 9, wherein an internal view of the sensor device 9 is shown, in which two such analysis channels 11, the generating device 12, the diverting device 97 and two such detectors 15 are shown. The analysis channels 11 extend in each case along an extent direction 108, wherein the analysis channels 11 are spaced apart from one another transversely with respect to the direction of extent 108. The generating device 12 and the diverting device 97 are arranged between the analysis channels 11. The generating device 12 is arranged so as to emit the generated electromagnetic waves 13 along the extent direction 108. The emitted electromagnetic waves 13 and the analysis channels 11 thus run substantially axially parallel to and spaced apart from one another. The respective analysis channel 11 has, as mentioned above, a channel casing 98 which delimits a flow path of the air flowing through the analysis channel 11 at the outer side. It can be seen that the respective interaction section 79 is formed by an interruption 80 of the channel casing 98, such that the electromagnetic waves 13 diverted by means of the diverting device 97 pass through the interaction section 79 without interacting with the channel casing 98, and interact with the air flowing through the analysis channel 11. In the example shown, the diverting device 97 has a conductor 104 which guides or conducts the electromagnetic waves 13 emitted by the generating device 12. In particular, the diverting device 97 may be designed as such a conductor 104. The conductor 104 may be a glass fibre 105 or a bundle 106, in particular glass fibre bundle 106'. In the example shown, the conductor 104 has two branching points 107, wherein the respective branching point 107 is assigned to one such interaction section 79, such that the respective branching point 107 allows a partial beam 100 of the emitted electromagnetic waves 13 to pass through the associated interaction section 79, wherein the respective branching point 107 is advantageously arranged outside the associated interaction section 79 and, at the exit side, that is to say at the end side at the point at which the associated partial beam 100 exits the branching point 107, is arranged close to the associated interaction section 79. The electromagnetic waves 13 emitted in the extent direction 108 are thus diverted so as to be inclined or perpendicular to the extent direction 108 by means of the diverting device 97, wherein, in the example shown in FIG. 5, the partial beams 100 run so as to be inclined or perpendicular to the extent direction 108.

The use of such a conductor 104 makes it possible for the electromagnetic waves 13 emitted by the generating device 12 to be diverted not only in a linear manner but also in a curved manner and/or across obstructions, such that the diverted electromagnetic waves 13, in particular in the form of such partial beams 100, pass through at least one such interaction section 79 and interact with air flowing through the associated analysis channel 11. It is preferable here if the conductor 104 is, at the entry side, that is to say at the point at which the electromagnetic waves 13 generated by the generating device 12 enter the conductor 104, is fixed relative to, in particular on, the generating device 12. In this way, actions of mechanical vibrations on the sensor device 9, which may arise in particular during the operation of the air-conditioning system 3 or of the vehicle 1, are prevented or at least reduced. Analogously, for this purpose, it is preferable if the conductor 104, in particular the respective branching point 107, is, at the exit side, fixed with respect to the associated interaction section 79, in particular to the associated analysis channel 11, such that the influence of mechanical actions, in particular vibrations, is prevented or at least reduced.

Figure 6:
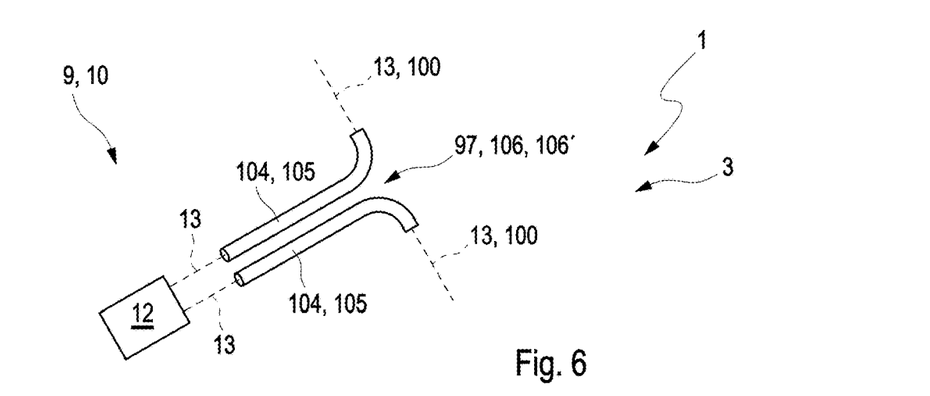
FIG. 6 shows a detail of the air-conditioning system with the diverting device in a further exemplary embodiment.

FIG. 6 illustrates a further exemplary embodiment, wherein only the generating device 12 and the diverting device 97 are shown. In this exemplary embodiment, the diverting device 97 has two such separate conductors 104, wherein the respective conductor 104 is assigned to one such interaction section 79. This permits a more flexible arrangement of the respective analysis channels 11, in particular of the interaction sections 79. The conductors 4 may in this case be a constituent part of such a bundle 106. This means that the diverting device 97 may be such a bundle 106, in particular glass fibre bundle 106'.

Figure 7:
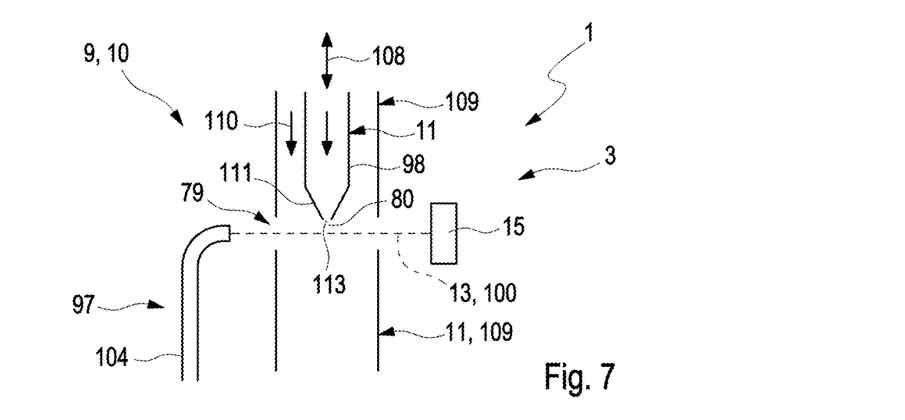
FIG. 7 shows a longitudinal section through the sensor device in a further exemplary embodiment.

FIG. 7 shows a section through the sensor device 9 or the air-conditioning system 3 in a further exemplary embodiment, wherein a longitudinal section through such an analysis channel 11 is shown. Furthermore, only the diverting device 97, which has such a conductor 104 assigned to the interaction section 79 of the analysis channel 11 shown, and the associated detector 15 are shown. In this exemplary embodiment, the analysis channel 11 is surrounded by an enveloping-air channel 109, which delimits an enveloping-air flow path 110 of enveloping air flowing through the enveloping-air channel 109. The enveloping air is preferably air that differs from the air flowing through the analysis channel 11, in particular is purified air, for example air filtered by means of the system filter device 6. Here, the enveloping-air flow path 110 surrounds the interruption 80, which forms the interaction section 79, of the analysis channel 11 such that the enveloping-air flow path 110 delimits, at the outer side, the flow of the air flowing through the analysis channel 11 through the interaction section 79. In other words, the enveloping-air flow path 110 prevents air that flows through the analysis channel 11 from flowing out of the analysis channel 11 in the interaction section 79 and contaminating the sensor device 9, in particular the generating device 12, the respective detector 5 and/or the diverting device 97. The enveloping-air channel 109 preferably has an interruption 80 which is aligned with the interruption 80 of the analysis channel 11 and thus with the interaction section 79, wherein the interruptions 80 of the channels 11, 109 are arranged such that the associated diverted electromagnetic waves 13, in particular the associated partial beam 100, pass through the channel casing 98 and the enveloping-air channel 109 without interacting with these. Since the enveloping air is purified or filtered air, the interaction of the diverted electromagnetic waves 13 with the enveloping air is prevented or at least reduced here.

In this exemplary embodiment, the analysis channel 11 and the enveloping-air channel 109 run in merged or unified fashion downstream of the interaction section 79. This means that air flowing through the analysis channel 11 and enveloping air are mixed, and conducted jointly, downstream of the interaction section 79. In particular, said mixture may be returned to the channel system 39 via the sensor outlet 47.

In this exemplary embodiment, the analysis channel 11 has a channel nozzle 111 which opens into the interaction section 79. The channel nozzle 111 thus narrows, in the flow direction of the air flowing through the analysis channel 11, towards the interaction section 79. Consequently, an outflow of the air flowing through the analysis channel 11 out of the interaction section 79, in particular into the sensor housing 45, is prevented or at least reduced.

Figure 8:
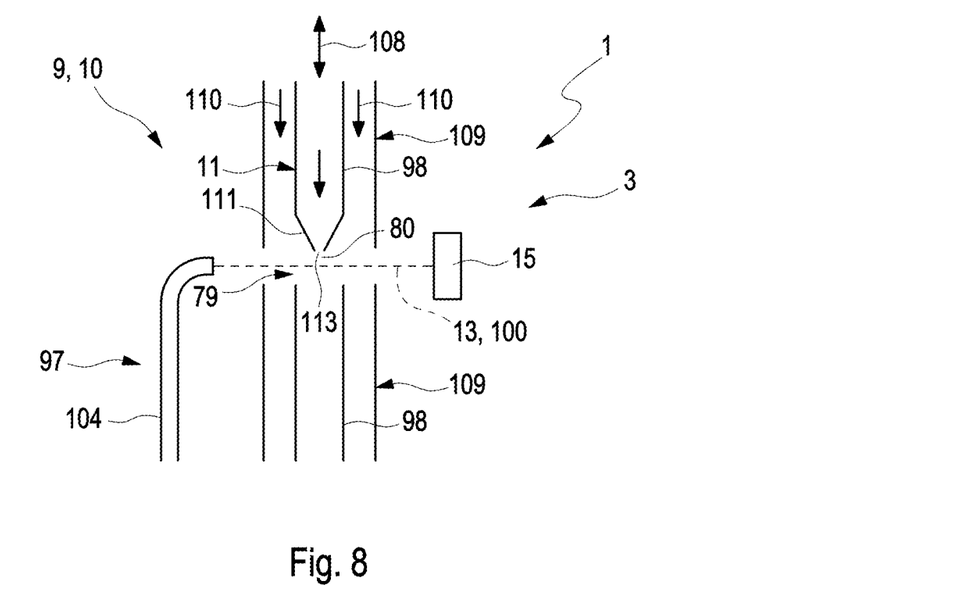
FIG. 8 shows the view from FIG. 7 in another exemplary embodiment.

FIG. 8 shows another exemplary embodiment, which differs from the example shown in FIG. 7 in that the analysis channel 11 and the enveloping-air channel 109 run separately downstream of the interaction section 79. In this way, the mixing of the air flowing through the analysis channel 11 with the enveloping air can be reduced.

In the exemplary embodiment shown in FIG. 5, the interruption 80 of the analysis channel 11 is of closed encircling form in the circumferential direction. This means that the interruption 80 in the analysis channel 11 forms a local separation of the analysis channel 11. This may also apply in the case of the interruptions 80 of the channels 11, 109 shown in FIGS. 7 and 8.

Figure 9:
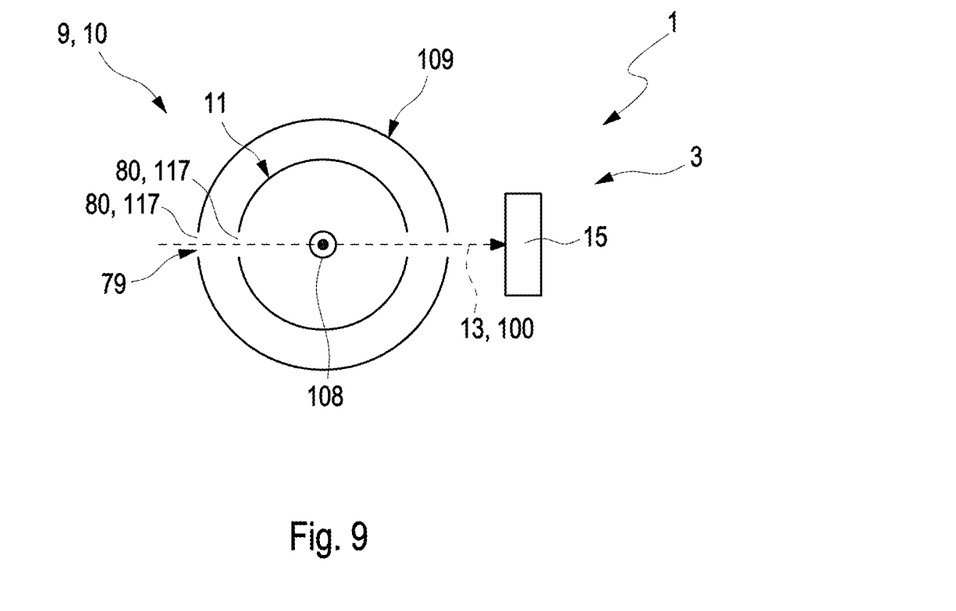
FIG. 9 shows a cross section through an analysis channel of the sensor device in a further exemplary embodiment, FIGS. 10 and 11 each show a longitudinal section through the sensor device in different exemplary embodiments.

As shown in FIG. 9, it is equally conceivable for the respective interruption 80 be realized only over a partial region in the circumferential direction, such that the diverted electromagnetic waves 13 pass through the respective channel 11, 109 without interacting therewith. The interruption 80 is thus formed as an aperture 117 in the associated channel 11, 109, hereinafter also referred to as channel aperture 117. In this way, in particular, the outflow of the air flowing through the analysis channel 11 out of the interaction section 79 is prevented, or at least further reduced, in a simplified manner.

Figure 10:
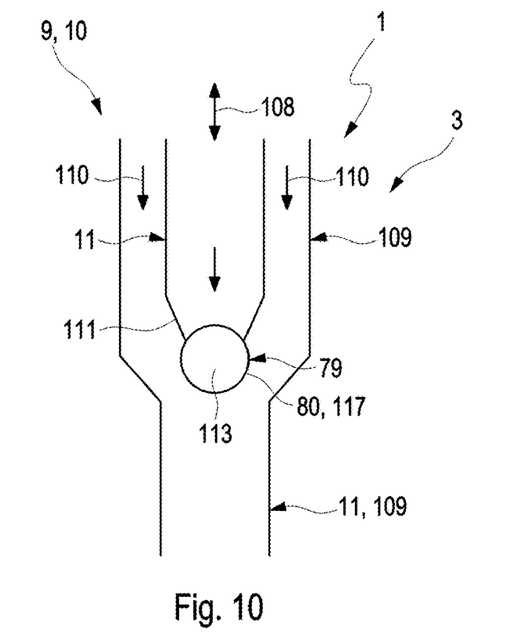

Another exemplary embodiment of the sensor device 9 or of the air-conditioning system 3 is shown in FIG. 10. Here, the illustration shows a longitudinal section through the analysis channel 11 and through the enveloping-air channel 109, wherein the interruptions 80 of the channels 11, 109 are illustrated as being in alignment. In this example, it is thus possible for the diverted electromagnetic waves 13 (not illustrated) to run perpendicular to the plane of the drawing. This exemplary embodiment differs from the exemplary embodiment shown in FIG. 8 firstly by the design of the respective interruption 80 as a channel aperture 117, such that said apertures extend only over partial regions in the circumferential direction. Secondly, the enveloping-air channel 109 in the examples shown in FIGS. 7 and 8 has substantially the same cross section downstream of the interaction section 79 as upstream of the interaction section 79, whereas the enveloping-air channel 109, which downstream of the interaction section 79 runs jointly with the analysis channel 11, has a larger flow cross section downstream of the interaction section 79 than upstream of the interaction section 79. Here, said flow cross section becomes smaller in the region of the interaction section 79 in substantially continuous fashion in the flow direction of the air, and is subsequently substantially constant again. Consequently, the outflow of the air flowing through the analysis channel 11 out of the interaction section 79 can be further reduced.

Figure 11:
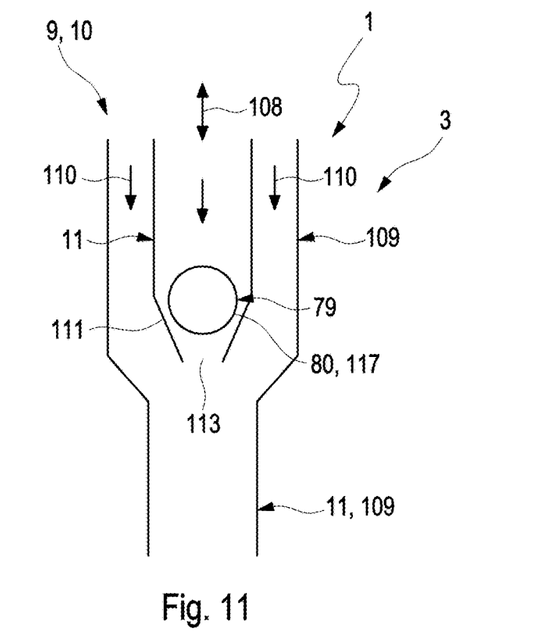

A further exemplary embodiment is shown in FIG. 11, wherein said exemplary embodiment differs from the example shown in FIG. 10 in that the interaction section 79 is, with respect to the air flowing through the analysis channel 11, arranged upstream of an outlet-side end 113 of the channel nozzle 11. In this way, for the air flowing through the analysis channel, an improved suction action in the region of the interaction section 79 is achieved, such that an outflow of the air out of the interaction section 79 is prevented or at least reduced. In this example, the interaction section 79 is in this case provided at least partially within the channel nozzle 111.

Figure 12:
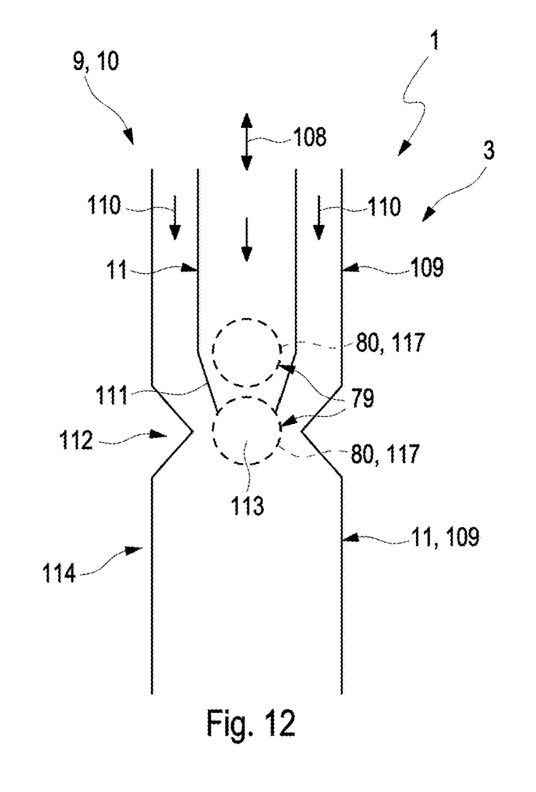
FIGS. 12 and 13 show the view from FIG. 11 in a different exemplary embodiment in each case.

A further exemplary embodiment is shown in FIG. 12. Said exemplary embodiment differs from the examples shown in FIGS. 10 and 11 in that the enveloping-air channel 109 has a local constriction 112 in the region of the outlet-side end 113 of the channel nozzle 111. This means that the flow cross section through the enveloping-air channel 109 is decreased in size in the region of the outlet-side end 113 of the channel nozzle 111 and is subsequently increased in size again, in particular is increased in size such that the flow cross section substantially corresponds to the flow cross section upstream of the constriction 112. Here, the interaction section 79 may, as shown in FIG. 11, be arranged upstream of the outlet-side end 113, or the channel nozzle 111 may, as illustrated in FIG. 10, open into the interaction section 79. The local constriction 112 is realized in FIG. 12 by a symmetrical, pointed profile or angular profile of the enveloping-air channel 109.

Figure 13:
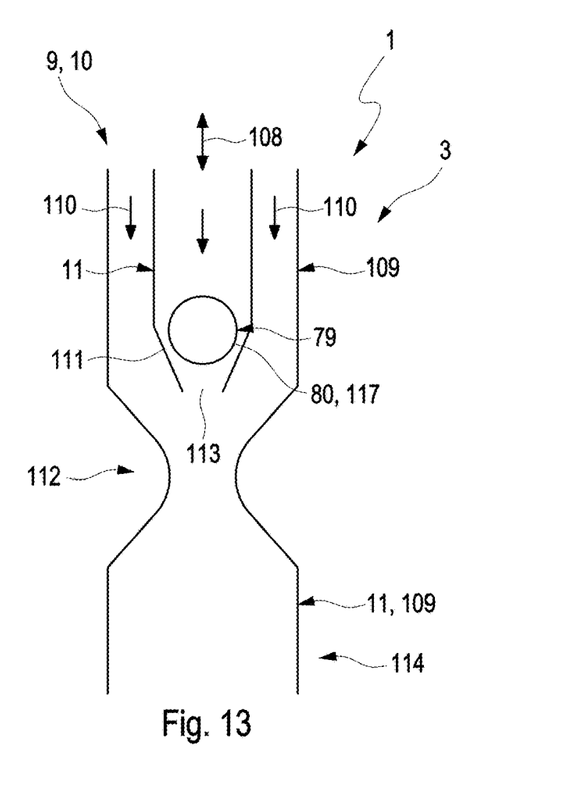

FIG. 13 shows a further exemplary embodiment, which differs from the example shown in FIG. 12 by a curved profile, which is more elongate and symmetrical in the flow direction of the air, of the enveloping-air channel 109 for forming the local constriction 112.

In the examples shown in FIGS. 12 and 13, the enveloping-air channel 109 is thus realized in the manner of a Venturi tube. Consequently, air flowing through the interaction section 79 is subsequently, that is to say at the downstream side, sucked into the enveloping-air channel 109 or the analysis channel 11 again, such that an outflow of the air, in particular of the air flowing through the analysis channel 11, out of the interaction section 79 to the outside of the analysis channel 11 is prevented or at least reduced.

Figure 14:
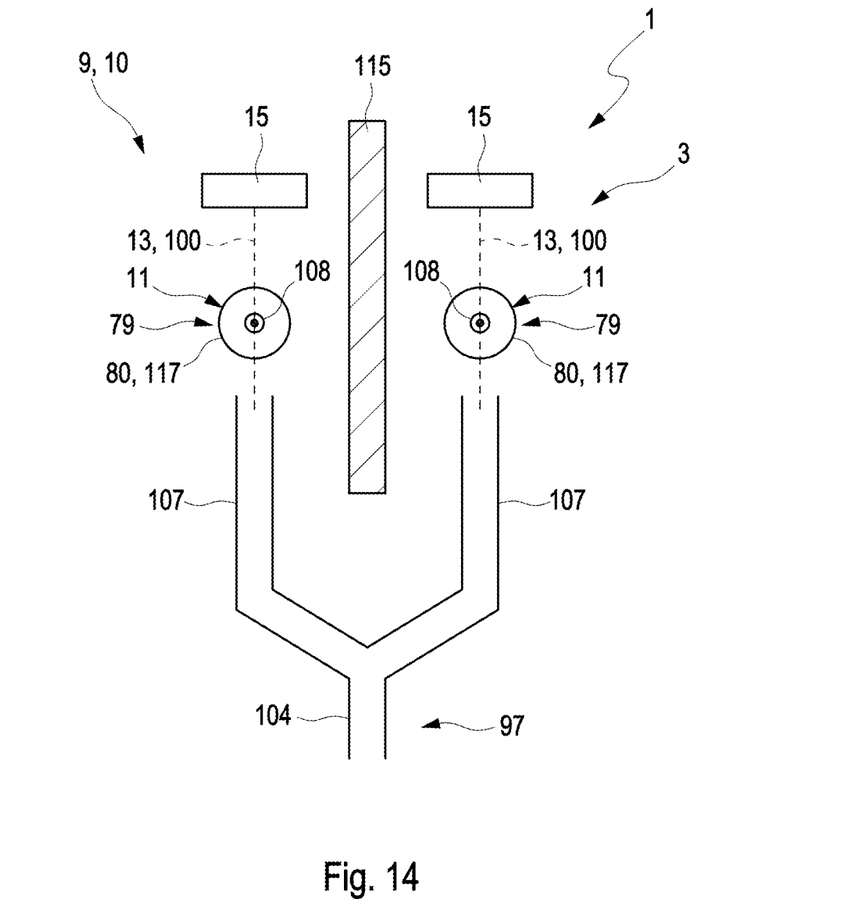
FIG. 14 shows a cross section through the sensor device in a further exemplary embodiment.

FIG. 14 shows a further exemplary embodiment of the sensor device 9 or of the air-conditioning system 3, wherein a section is shown in which cross sections through two such analysis channels 11 in the region of the associated interaction sections 79 are shown. The analysis channels 11 are arranged spaced apart from one another, wherein electromagnetic waves 13 diverted by means of the diverting device 79, which may be formed for example as such a conductor 104 with such branching points 107, in particular partial beams 100, are supplied to the respective interaction section 79, which electromagnetic waves pass through the interaction section 79 of the associated analysis channel 11 and, in so doing, interact with air flowing through the analysis channel 11. After the interaction, the diverted electromagnetic beams 13 are detected by such an associated detector 15. In this example, between the interaction sections 79 of the spaced-apart analysis channels 11, there is arranged a partition 115 which is impermeable to air and impermeable to light. The partition 5 prevents air that flows through one of the analysis channels 11 from passing to the interaction section 79 of the other analysis channel 11, or at least reduces such a flow. Furthermore, the influence of scattered light is prevented. Thus, the precision of the detection of the at least one property of the respective air flowing through the associated analysis channel 11 is increased. The partition 115 preferably extends along the analysis channels 11 and, in so doing, preferably runs at least between the interaction sections 79 of the different analysis channels 11.

In all of the examples shown, it is preferable if the flow of the air within the associated analysis channel 11 runs in the direction of gravitational force. For this purpose, the sensor device 9 and/or the at least one analysis channel 11 are arranged correspondingly. Such an arrangement has the result that dirt or particles contained in air flowing through the analysis channel 11 is/are deposited on a base of the sensor device 9 or of the sensor housing 45 as they emerge from the analysis channel 11 and enter the sensor housing 45. Consequently, such an emergence does not lead to contamination, or leads to at least reduced contamination, of the generating device 12 and/or of the diverting device 97 and/or of the at least one detector 15. Such an emergence may in this case occur in particular outside operation of the air-conditioning system 3 or of the sensor device 3, when air is not being conveyed, or is being conveyed with at least reduced action, through the analysis channel 11 and/or the associated enveloping-air channel 109.

The invention claimed is:

1. An air-conditioning system of a vehicle for air-conditioning a vehicle interior compartment, comprising a channel system through which air is flowable and a sensor device for detecting at least one property of the air, the sensor device including:
   at least two analysis channels through each of which the air is flowable, the at least two analysis channels disposed spaced apart from one another;
   an electromagnetic wave generating device;
   an electromagnetic wave diverting device disposed between the at least two analysis channels, and structured and arranged such that during operation electromagnetic waves emitted by the electromagnetic wave generating device are at least partially diverted via the electromagnetic wave diverting device into at least one interaction section of the at least two analysis channels and interact with an air flow of the air passing through the at least one interaction section; and
   an electromagnetic wave detector structured and arranged to detect the electromagnetic waves diverted via the electromagnetic wave diverting device that have interacted with the air flow.

2. The air-conditioning system according to claim 1, wherein:
   the electromagnetic wave generating device is arranged between the at least two analysis channels;
   the at least one interaction section of the at least two analysis channels includes a first interaction section and a second interaction section;
   the at least two analysis channels includes a first analysis channel and a second analysis channel, the first analysis channel including the first interaction section, the second analysis channel including the second interaction section; and
   the electromagnetic wave diverting device is disposed between the first analysis channel and the second analysis channel, and is structured and arranged such that during operation the electromagnetic waves emitted by the electromagnetic wave generating device are at least partially diverted via the electromagnetic wave diverting device into the first interaction section of the first analysis channel and into the second interaction section of the second analysis channel.

3. The air-conditioning system according to claim 1, wherein:
   the electromagnetic wave diverting device includes a beam splitter; and
   the electromagnetic wave diverting device is disposed between the at least two analysis channels, and is structured and arranged such that during operation the electromagnetic waves emitted by the electromagnetic wave generating device are split via the beam splitter into at least two partial beams and at least one of the at least two partial beams is directed into and passes through the at least one interaction section.

4. The air-conditioning system according to claim 1, wherein:
   the at least two analysis channels extend parallel to one another along an extent direction; and
   the electromagnetic wave generating device is structured and arranged such that during operation the electromagnetic waves are emitted along the extent direction via the electromagnetic wave generating device.

5. The air-conditioning system according to claim 1, wherein the sensor device further includes a sensor housing in which the at least two analysis channels, the electromagnetic wave generating device, the electromagnetic wave diverting device, and the electromagnetic wave detector are jointly arranged.

6. The air-conditioning system according to claim 1, wherein:
   the electromagnetic wave diverting device includes a conductor; and
   the conductor is structured and arranged such that during operation the electromagnetic waves emitted by the electromagnetic wave generating device are carried and diverted via the conductor into the at least one interaction section.

7. The air-conditioning system according to claim 6, wherein the conductor is structured as at least one of a glass fibre and a bundle of glass fibres.

8. The air-conditioning system according to claim 1, wherein the electromagnetic wave diverting device includes a mirror structured and arranged to reflect the electromagnetic waves emitted by the electromagnetic wave generating device during operation.

9. The air-conditioning system according to claim 1, wherein:
   the at least two analysis channels each include a channel casing delimiting a flow path of the air; and
   the at least one interaction section is structured as an interruption of the channel casing of one of the at least two analysis channels.

10. The air-conditioning system according to claim 9, wherein the at least two analysis channels include a channel nozzle arranged upstream of the interruption and oriented to narrow towards the interruption.

11. The air-conditioning system according to claim 9, wherein:
   the sensor device further includes at least two enveloping-air channels that each surround and extend along a respective analysis channel of the at least two analysis channels such that an enveloping-air flow path through which the air is flowable is delimited radially therebetween; and
   the interruption is surrounded by the enveloping-air flow path such that, in the at least one interaction section, the flow path is surrounded and delimited by the enveloping-air flow path.

12. The air-conditioning system according to claim 1, wherein the electromagnetic wave detector is arranged adjacent to the at least one interaction section.

13. The air-conditioning system according to claim 1, wherein the electromagnetic wave generating device is arranged outside of the at least two analysis channels.

14. A vehicle comprising a vehicle interior compartment and an air-conditioning system for air-conditioning the vehicle interior compartment, the air-conditioning system including a channel system through which air is flowable and a sensor device for detecting at least one property of the air, the sensor device including:
   two analysis channels through each of which the air is flowable, the two analysis channels including a first analysis channel and a second analysis channel, the first analysis channel including a first interaction section, the second analysis channel including a second interaction section;

an electromagnetic wave generating device arranged between the first analysis channel and the second analysis channel;

an electromagnetic wave diverting device structured and arranged such that during operation electromagnetic waves emitted by the electromagnetic wave generating device are at least partially diverted via the electromagnetic wave diverting device into (i) the first interaction section of the first analysis channel and interact with a first air flow of the air passing therethrough, and (ii) the second interaction section of the second analysis channel and interact with a second air flow of the air passing therethrough; and an electromagnetic wave detector structured and arranged to detect the electromagnetic waves diverted via the electromagnetic wave diverting device that have interacted with at least one of the first air flow and the second air flow.

15. An air-conditioning system of a vehicle for air-conditioning a vehicle interior compartment, comprising a channel system through which air is flowable and a sensor device for detecting at least one property of the air, the sensor device including:

a sensor housing defining a housing interior space;

an analysis channel having an interaction section, the analysis channel including a channel casing defining an air flow path and an interruption of the channel casing disposed in the interaction section;

an electromagnetic wave generating device;

an electromagnetic wave diverting device structured and arranged such that during operation electromagnetic waves emitted by the electromagnetic wave generating device are at least partially diverted via the electromagnetic wave diverting device through the interruption of the channel casing and interact with an air flow passing through the air flow path in the interaction section of the analysis channel;

an electromagnetic wave detector structured and arranged to detect the electromagnetic waves diverted via the electromagnetic wave diverting device that have interacted with the air flow;

wherein the analysis channel, the electromagnetic wave generating device, the electromagnetic diverting device, and the electromagnetic wave detector are arranged in the housing interior space; and wherein the air flow path of the analysis channel and the housing interior space are in fluid communication with one another via the interruption.

16. The air-conditioning system according to claim 15, wherein:

the sensor device further includes an enveloping-air channel that surrounds and extends along the analysis channel such that an enveloping-air flow path is delimited radially therebetween;

the enveloping-air channel includes a second interruption disposed in axial alignment with the interaction section of the analysis channel; and the interruption is surrounded by the enveloping-air flow path such that during operation an enveloping-air flow passing through the enveloping-air flow path prevents particles suspended in the air flow of the analysis channel from passing into the housing interior space via the interruption and the second interruption.

17. The air-conditioning system according to claim 16, wherein:

the interruption is structured as an aperture extending diametrically through the channel casing;

the second interruption is structured as a second aperture extending diametrically through the enveloping-air channel; and the aperture and the second aperture are arranged in axial alignment relative to the channel casing and the enveloping-air channel.

18. The air-conditioning system according to claim 16, wherein the interruption is structured as a break in the channel casing defining an axial separation between two sections of the channel casing.

19. The air-conditioning system according to claim 18, wherein:

the two sections of the channel casing include a first channel casing section and a second channel casing section; and an end of the first channel casing section disposed proximal the interruption includes a nozzle that is oriented to narrow towards an end of the second channel casing section such that during operation the air flow passing through the air flow path of the first channel casing section is directed across the axial separation between the two sections of the channel casing and into the air flow path of the second channel casing section via the nozzle.

20. The air-conditioning system according to claim 16, wherein:

the channel casing includes a nozzle disposed in the interaction section, the nozzle structured and arranged to narrow in a flow direction of the air flow passing through the air flow path during operation;

the interruption is structured as an axially facing nozzle tip opening of the nozzle; and the analysis channel and the enveloping-air channel are structured and arranged such that during operation the air flow passing through the analysis channel and the enveloping-air flow passing through the enveloping-air channel merge together downstream of the interaction section.

* * * * *